Figure 1:
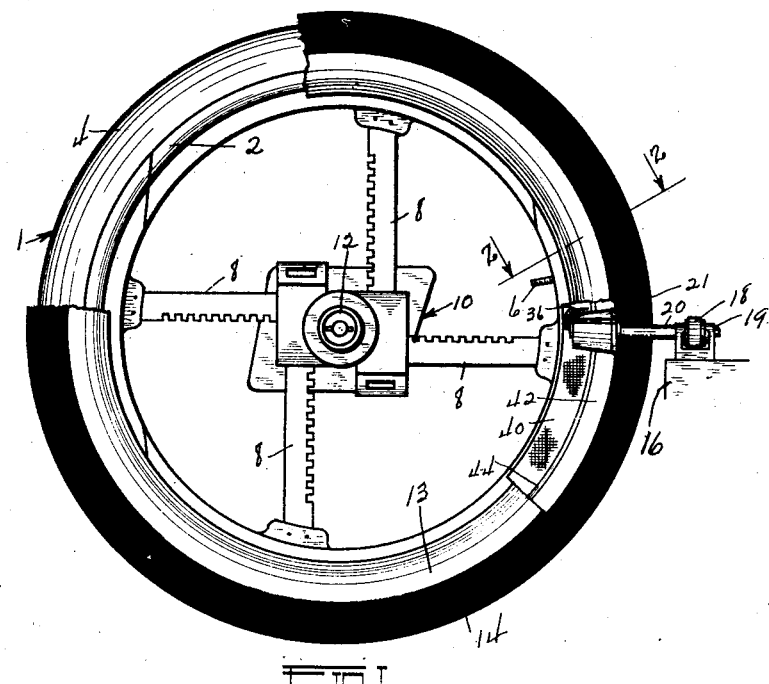

April 24, 1928.

G. F. WIKLE 1,667,135

TIRE BUILDING MACHINE

Filed March 19, 1924

2 Sheets-Sheet 1

GEORGE F. WIKLE
INVENTOR

BY *Robert D. Harvey*

ATTORNEY

April 24, 1928.   G. F. WIKLE   1,667,135

TIRE BUILDING MACHINE

Filed March 19, 1924   2 Sheets-Sheet 2

GEORGE F. WIKLE
INVENTOR

BY
ATTORNEY

Patented Apr. 24, 1928.

1,667,135

UNITED STATES PATENT OFFICE.

GEORGE F. WIKLE, OF MILWAUKEE, WISCONSIN.

TIRE-BUILDING MACHINE.

Application filed March 19, 1924. Serial No. 700,395.

My invention relates to machines for building pneumatic tire casings and more particularly to a device for applying certain elements to the sides of the tire carcass after the latter has been formed on the building core and preferably while it is still positioned thereon.

In the building of tire casings it is customary to build the carcass of bias cut rubberized fabric, which may be either square woven or one of the various kinds of so called cord fabric, all being hereinafter generally referred to as fabric. The carcass is formed on an annular core, the bead elements and tread elements are added and the tire is then ready for finishing by the addition of the side wall elements such as gum strips, chafing strips and side wall rubber.

It is the purpose of this invention to provide means for placing the side wall rubber and associated elements on the carcass, preferably as part of the machine operation and while the carcass is on the building core.

Figure 3:
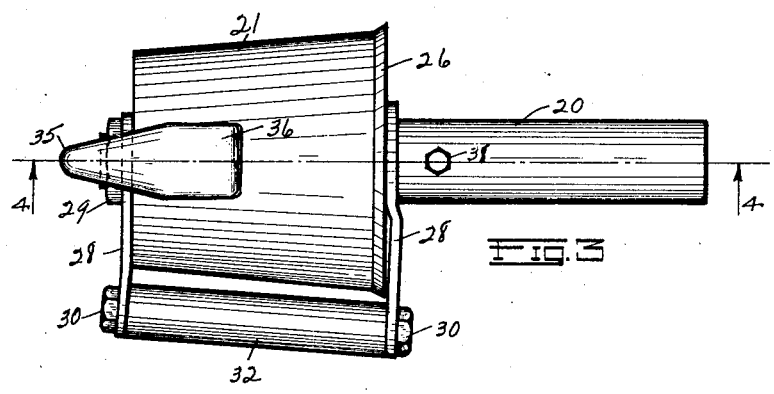
Figure 2:
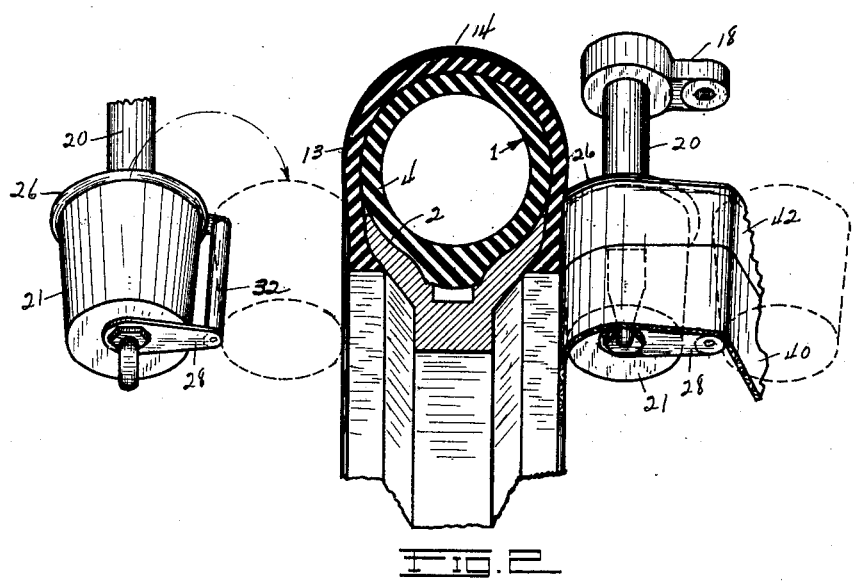
Figure 4:
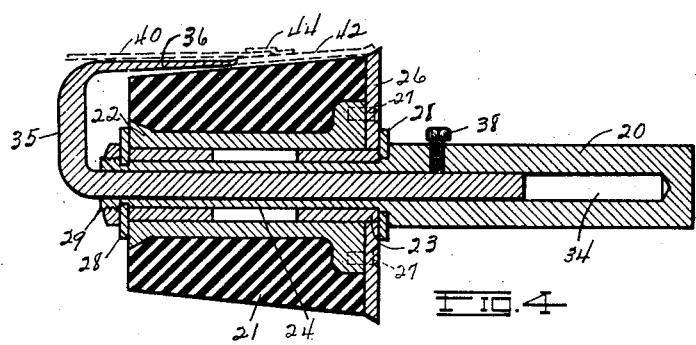

In the drawings which illustrate one embodiment of my invention,

Figure 1 is a side view showing my device in operative position with relation to the building core, Figure 2 is an enlarged section on line 2—2 of Figure 1, and showing the manner in which the side wall element is applied, Figure 3 is a plan view, on an enlarged scale, of the applying device, and Figure 4 is a section taken on the line 4—4 of Figure 3.

In the drawings 1 represents a building core which in the form illustrated comprises a rim 2 supporting an air bag 4 such as is customarily inserted in a casing of the cord type prior to its being placed in the mold, the rim being provided with a suitable aperture to accommodate the valve 6 of the air bag. The rim is preferably formed in sections which are adapted to be retracted by racks 8 secured to the rim sections and by a chuck 10, mounted on a shaft 12 which is power rotated by any suitable means such as that disclosed in my copending application, Serial Number 697,200, filed March 4, 1924. The tire carcass formed on the core is shown at 13 in Figure 1, the tread being indicated at 14, the carcass and tread being broken away at the left of said figure to show the core.

The side wall applying devices are preferably mounted on a suitable standard 16 adapted to be positioned adjacent the building core. As shown, this standard is provided with brackets 18 hinged to the standard at 19, and supporting at their free ends shafts 20 upon which applying rolls 21 are freely mounted. It will be understood that any suitable mounting may be provided for rolls 21 and the mounting above described is illustrative only. Rolls 21 are formed of relatively soft rubber preferably vulcanized in position on sleeves 22 rotating on bushings 23 formed integral with or suitably secured to reduced portions 24 of shafts 20. Rolls 21 are provided at their inner ends with beveled metal discs 26 secured to sleeves 22 by screws 27. Arms 28 are non-rotatably mounted on shafts 20 adjacent the ends of rolls 21 and the shafts 20 are threaded at their outer ends to receive nuts 29 which retain arms 28 and rolls 21 in position on the shafts. Arms 28 support between their outer ends shafts 30 on which are rotatably mounted tension rolls 32.

The shafts 20 are centrally bored at 34 to receive rods 35 the ends of which are bent upwardly and rearwardly to overlie the rolls 21 and terminate in blade-like guides 36. Rods 35 are held in longitudinally and axially adjusted position by set screws 38.

The operation is as follows: With brackets 18 swung outwardly about their pivots 19 as shown in full line at the left of Figure 2 and in dotted line at the right of said figure, standard 16 is moved toward the building core to position rolls 21 adjacent the sides of the carcass as shown in Figure 1. One end of a side wall strip is then pressed in proper position against the side of the carcass and roll 21 is swung about its pivot 19 to firmly press the end of the strip against the tire carcass. The side wall strip is composed of a chafing strip 40, side wall rubber strip 42, and gum strip 44. The operator brings the strip, now gripped between the core and roll 21, across the face of the roll and down over tension roll 32, (see Figure 2) with the chafing strip overlying blade 36 the edge of which abuts against the vertical edge of the side wall rubber strip 42 (see Figure 4) and serves to guide the unit strip into proper position on the carcass. When the core is placed in rotation the strip, being tacky and being uniformly pressed against the tire carcass by roll 21, is applied thereto in proper position, beveled disk 26 forcing the edge of the side wall rubber into the soft tread rubber which it overlaps. The operation is then repeated on the other side of the carcass to complete the tire.

It will be understood that my invention is not restricted to the application of a side wall strip of the specific form shown and that, while I have illustrated my invention in relation to a resilient building core, it may be used with any type of building core such as an iron core, collapsible or otherwise.

What I claim as my invention is:—

1. A device of the character described comprising a rotatable core, a resilient roll, freely rotatable upon a shaft, and adapted to be positioned against the side of a tire carcass supported on said core, and a tension roll and a guiding device supported by said shaft.

2. A device of the character described comprising a rotatable core, a resilient roll adapted to be positioned against the side of a tire carcass supported on said core, an unyielding disk secured to one end of said roll and strip guiding and tensioning means associated therewith.

3. Side wall applying means comprising a resilient roll, a tension roll adjacent thereto and a guiding blade overlying the surface of said resilient roll.

4. Side wall applying means comprising a resilient roll rotatable upon a shaft, and a tension roll and guiding blade supported by said shaft.

5. Side wall applying means comprising a resilient roll, an unyielding disk secured to one end of said roll and projecting beyond its surface, a shaft upon which said roll is freely rotatable, a tension roll supported by said shaft adjacent the surface of the resilient roll and a strip guiding blade adjustably secured to said shaft and overlying the applying roll.

6. Side wall applying means comprising a resilient roll and a metal disk adjacent said roll, said disk being beveled, the beveled portion projecting beyond the surface of said roll and adapted to engage the outer edge of the side wall.

7. Side wall applying means comprising a roll adapted to press a side wall strip in place against a tire carcass, tension means spaced from said roll and a guiding means positioned between said tension means and the point of application of the strip.

8. Side wall applying means comprising a roll adapted to press a side wall strip in place against a tire carcass, tension means spaced from said roll and a guiding means positioned to engage the under side of the strip as the latter passes from the tensioning means to the applying roll.

9. A device for applying a compound side wall strip to a tire carcass comprising an applying roll adapted to press the strips in place against the carcass and a guiding member positioned to engage an intermediate longitudinal edge of the compound strip as the latter passes to the applying roll.

10. A device for applying a compound side wall strip to a tire carcass comprising a roll adapted to press the strip in place against the tire carcass, tension means spaced from said roll and a guiding member, positioned between said tension means and the point of application of the strip, adapted to underlie the strip and engage an intermediate longitudinal edge of the compound strip as the latter passes to the applying roll.

In testimony whereof I have signed my name to the above specification.

GEORGE F. WIKLE.